(12) United States Patent
Molotsi et al.

(10) Patent No.: US 8,135,635 B2
(45) Date of Patent: Mar. 13, 2012

(54) SYSTEM AND METHOD FOR TIME TRACKING ON A MOBILE COMPUTING DEVICE

(75) Inventors: Hugh N. Molotsi, Mountain View, CA (US); Michael Leftwich, Plano, TX (US); Yexin Huang, Plano, TX (US); Thomas E. Leep, San Francisco, CA (US); Siddharth Gidwani, Mountain View, CA (US); Leon Campise, Plano, TX (US); Judd Conrad Jacobs, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 617 days.

(21) Appl. No.: 12/253,151

(22) Filed: Oct. 16, 2008

(65) Prior Publication Data

US 2010/0100463 A1    Apr. 22, 2010

(51) Int. Cl.
*G06F 15/02* (2006.01)
*G07C 1/10* (2006.01)
*G07B 17/00* (2006.01)
*G07F 19/00* (2006.01)
*H04M 15/00* (2006.01)
(52) U.S. Cl. ............................... 705/32; 705/30; 705/34
(58) Field of Classification Search .................... 705/30, 705/32, 34
See application file for complete search history.

(56) References Cited

U.S. PATENT DOCUMENTS

| | | | |
|---|---|---|---|
| 6,272,532 B1 | 8/2001 | Feinleib | |
| 2002/0002581 A1 | 1/2002 | Siddiqui | |
| 2002/0046248 A1 | 4/2002 | Drexler | |
| 2003/0200272 A1 | 10/2003 | Campise et al. | |
| 2006/0195347 A1 | 8/2006 | Bultmeyer et al. | |
| 2006/0277544 A1 | 12/2006 | Bjoernsen et al. | |
| 2007/0074121 A1 | 3/2007 | Mullender et al. | |
| 2007/0264974 A1* | 11/2007 | Frank et al. | 455/411 |
| 2009/0234780 A1* | 9/2009 | Drucker et al. | 705/418 |
| 2009/0291665 A1* | 11/2009 | Gaskarth et al. | 455/405 |
| 2011/0125744 A1* | 5/2011 | Immonen et al. | 707/737 |

FOREIGN PATENT DOCUMENTS

JP    2006227751 A    8/2006

OTHER PUBLICATIONS

International Search Report issued in PCT/US2009/060582, dated May 19, 2010, 3 pages.
Written Opinion issued in PCT/US2009/060582, dated May 19, 2010, 3 pages.

* cited by examiner

*Primary Examiner* — Ig T An
(74) *Attorney, Agent, or Firm* — Osha • Liang LLP

(57) ABSTRACT

The invention relates to a method for tracking time using a mobile computing device. The method steps include providing a first event manager on the mobile computing device for managing event records, wherein each event record is synchronized via an exchange server to a corresponding event record managed by a second event manager on a client machine, generating a time tracking record based on input from a user of the mobile computing device, wherein the time tracking record is added to the event records as a surrogate event record, transmitting the surrogate event record via the exchange server to the second event manager operatively coupled to a client application on the client machine, extracting time entry information from the surrogate event record using the client application for tracking time, and generating estimated time entry information automatically based on the event record.

13 Claims, 7 Drawing Sheets

SYSTEM AND METHOD FOR TIME TRACKING ON A MOBILE COMPUTING DEVICE

CROSS-REFERENCE TO RELATED APPLICATIONS

Subject matter contained in the present document may be related to subject matter contained in copending U.S. patent application Ser. No. 12/179,480, entitled "System And Method For Time Tracking," filed on Jul. 24, 2008, and assigned to the same assignee.

BACKGROUND

Tracking the time spent by an employee (or contractor) on various tasks is a critical component in the operation of an organization. Typically, the organization requires the employee to manually track and record the amount of time being spent on each task using, for example, a timesheet. A timesheet may record the start and end time of tasks, or just the duration. A timesheet may also contain a detailed breakdown of tasks accomplished throughout the project or program. This information may be used for payroll, client billing, and increasingly for project costing, estimation, tracking and management.

At the end of each day, week, month, or as dictated by the policies of the organization, the employee submits the timesheet to an organization's administrator who then manually re-enters the timesheet into the correct systems (i.e., payroll, billing, reporting, etc.). Both the completion of the timesheet by the worker and the entry of the timesheet into a system by the administrator are opportunities for human error.

SUMMARY

In general, in one aspect, the invention relates to a method for tracking time using a mobile computing device. The method steps include providing a first event manager on the mobile computing device for managing a plurality of event records corresponding to a plurality of events, wherein each event record of the plurality of event records is synchronized via an exchange server to a corresponding event record managed by a second event manager on a client machine, generating a time tracking record comprising time entry information, wherein the time tracking record is generated based on input from a user of the mobile computing device, wherein the time tracking record is added to the plurality of event records as a surrogate event record, transmitting the surrogate event record via the exchange server to the second event manager, wherein the second event manager is operatively coupled to a client application on the client machine, extracting the time entry information from the surrogate event record using the client application for tracking time, and generating estimated time entry information automatically based on the event record, wherein the time entry information from the estimated time entry information is generated based on user review.

In general, in one aspect, the invention relates to a method for tracking time. The method steps include providing a first event manager on a first machine for managing a plurality of event records corresponding to a plurality of events, wherein an event record of the plurality of event records is synchronized via an exchange server to a corresponding event record managed by a second event manager on a second machine, generating a time tracking record comprising time entry information, wherein the time tracking record is generated based on input from a user of the first machine, wherein the time tracking record is added to the plurality of event records as a surrogate event record, transmitting the surrogate event record via the exchange server to the second event manager, wherein the second event manager is operatively coupled to a client application on the second machine, extracting the time entry information from the surrogate event record using the client application for tracking time, and generating estimated time entry information automatically based on the event record, wherein the time entry information from the estimated time entry information is generated based on user review.

In general, in one aspect, the invention relates to a computer readable medium storing instructions for tracking time using a mobile computing device. The instructions include functionality for providing a first event manager on the mobile computing device for managing a plurality of event records corresponding to a plurality of events, wherein an event record of the plurality of event records is synchronized via an exchange server to a corresponding event record managed by a second event manager on a client machine, generating a time tracking record comprising time entry information, wherein the time tracking record is generated based on input from a user of the mobile computing device, wherein the time tracking record is added to the plurality of event records as a surrogate event record, transmitting the surrogate event record via the exchange server to the second event manager, wherein the second event manager is operatively coupled to a client application on the client machine, extracting the time entry information from the surrogate event record using the client application for tracking time, and generating estimated time entry information automatically based on the event record, wherein the time entry information from the estimated time entry information is generated based on user review.

In general, in one aspect, the invention relates to a computer readable medium storing instructions for tracking time. The instructions include functionality for providing a first event manager on a first machine for managing a plurality of event records corresponding to a plurality of events, wherein an event record of the plurality of event records is synchronized via an exchange server to a corresponding event record managed by a second event manager on a second machine, generating a time tracking record comprising time entry information, wherein the time tracking record is generated based on input from a user of the first machine, wherein the time tracking record is added to the plurality of event records as a surrogate event record, transmitting the surrogate event record via the exchange server to the second event manager, wherein the second event manager is operatively coupled to a client application on the second machine, extracting the time entry information from the surrogate event record using the client application for tracking time, and generating estimated time entry information automatically based on the event record, wherein the time entry information from the estimated time entry information is generated based on user review In general, in one aspect, the invention relates to a system for tracking time using a mobile computing device. The system includes the mobile computing device having a first event manager for managing a plurality of event records corresponding to a plurality of events, a client machine having a second event manager and a client application operatively coupled to each other, an exchange server operatively coupled to the mobile computing device and the client machine, wherein each event record of the plurality of event records is synchronized via the exchange server to a corresponding event record managed by the second event manager on the client machine, and memory comprising instructions executed by a processor to generate a time tracking record comprising time entry information, wherein the time tracking record is generated based on input from a user of the mobile computing device, wherein the time tracking record is added to the plurality of event records as a surrogate event record, transmit the surrogate event record via the exchange server to the second event manager, extracting the time entry information from the surrogate event record using the client application for tracking time, and generating estimated time entry information automatically based on the event record, wherein the time entry information from the estimated time entry information is generated based on user review, wherein the event record comprises at least one selected from a group consisting of a calendar entry, a phone call log entry, an email repository entry, and a text message log entry, and wherein the time entry information comprises at least one selected from a group consisting of a time tracking category and a billable time.

In general, in one aspect, the invention relates to a system for tracking time. The system includes a first machine having a first event manager for managing a plurality of event records corresponding to a plurality of events, a second machine having a second event manager and a client application operatively coupled to each other, an exchange server operatively coupled to the first machine and the second machine, wherein each event record of the plurality of event records is synchronized via the exchange server to a corresponding event record managed by the second event manager on the second machine, and memory comprising instructions executed by a processor to generate a time tracking record comprising time entry information, wherein the time tracking record is generated based on input from a user of the first machine, wherein the time tracking record is added to the plurality of event records as a surrogate event record, transmit the surrogate event record via the exchange server to the second event manager, wherein the second event manager is operatively coupled to a client application on the second machine, extract the time entry information from the surrogate event record using the client application for tracking time, and generating estimated time entry information automatically based on the event record, wherein the time entry information from the estimated time entry information is generated based on user review.

Other aspects of the invention will be apparent from the following description and the appended claims.

DETAILED DESCRIPTION

Figure 1A:
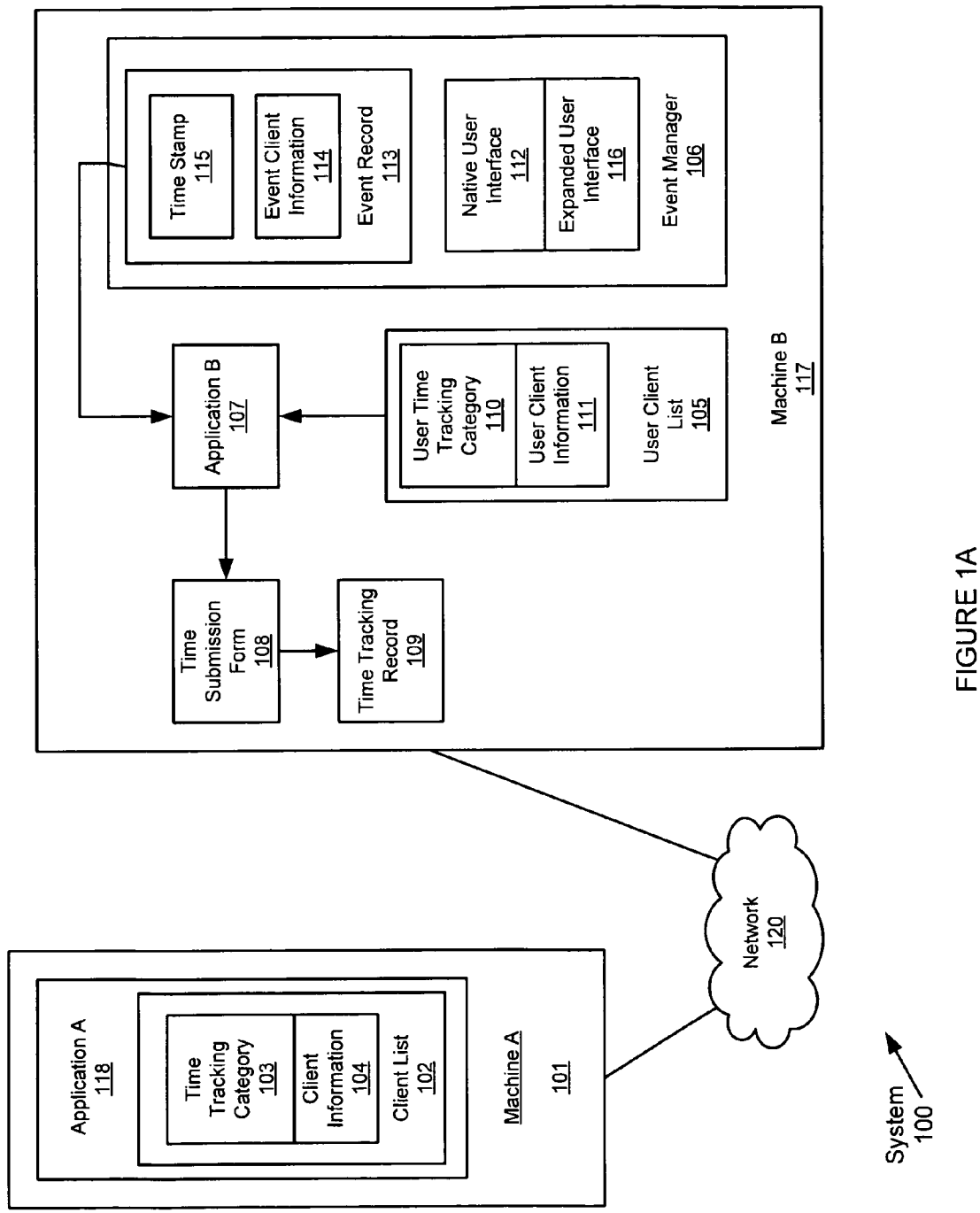
FIGS. 1A and 1B depict schematic block diagrams of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to track time based on events, timestamps for the events, and mappings relating the events to time tracking categories of clients with whom the events are associated. Typically, multiple events may be involved in performing a task; multiple tasks may be performed for each project (or program); and one or more projects may be actively worked on for a client. In addition, each client may be designated with multiple time tracking categories that categorize the work performed for the client as related to various projects, programs, tasks, types, or other suitable categories. Examples of time tracking categories include customer job, service item, etc.

FIG. 1A depicts a system (100) in accordance with one or more embodiments of the invention. As shown in FIG. 1A, the system (100) has multiple components including machine A (101) and machine B (117) operatively coupled to a network (120) for performing online and/or offline operations. The machine A (101) or the machine B (117) may be, for example a server, mainframe, desktop Personal Computer (PC), laptop PC, notebook PC, Personal Digital Assistant (PDA), television, cable box, satellite box, kiosk, telephone, mobile phone, etc. that are employed in tracking, organizing, accounting, or otherwise managing time spent on performing tasks relating to projects for clients. The network (120) may include multiple nodes having wired and/or wireless segments and provide data and/or voice communication functionalities.

The machine A (101) may include application A (118) accessible by multiple users via the network (120) using devices such as the machine B (117). Application A (118) may include or have access to a client list (102) for a corporation or company. The client list (102) associates a time tracking category (e.g., customer job, service item, or other suitable category for tracking time spent working for a client) of a client with client information of the client. The client list (102) may be formed in many different ways in the format of one or more list, one or more file, one or more database, other suitable datastore, or combinations thereof. A typical example of the client list (102) may include multiple entries such as one containing time tracking category (103) associated with client information (104). Multiple time tracking categories may typically be assigned for a client. The client information (104) may include one or more names, one or more addresses, one or more phone numbers, one or more email addresses, and/or other relevant information. In the application A (118), information relating to tasks performed for a client are typically identified by or associated with corresponding time tracking category such as the time tracking category (103). Although the example given above associates the time tracking category with the client information directly in an entry, those skilled in the art will appreciate that the client list (102) may be implemented with indirect association without deviating from the invention. For example, the time tracking category may be associated with a client ID in an entry while client information is associated with the client ID separately. In this example, the association between the client ID and the time tracking category may be implemented in the same or different types of data structures (e.g., a list, a file, a database, etc.) as the association between the client ID and client information.

A task may be performed involving various events e.g., an appointment, a phone call, an email communication, a text message, etc.) associated with the task. The machine B (117)

may be used by an individual user and include an application B (107) (e.g., for tracking time) working in conjunction with an event manager (106) (e.g., for managing appointment calendar, phone log, etc.). Examples of event manager include personal productivity software performing personal information management (PIM) function for the user. The event manager (106) may include a user interface (112) for providing user interaction function with respect to event related information such as an event record (113) (e.g., a client appointment in the calendar, a client phone call record in the phone log, etc.). The event record (113) may include event client information (114) (e.g., name of client for the appointment, phone number of the client phone call, etc.) as related to the event and time stamp (115) (e.g., appointment schedule, time of phone call, etc.) marking the occurrence of the event. For example, if the event record (113) is associated with a task performed for the client assigned the time tracking category (103), the event client information (114) may be related to and be found in the client information (104). In addition, the machine B (117) may include a user client list (105), which may be a subset of the client list (102) retrieved from the machine A (101) according to a pre-determined access authorization scheme. The user client list (105) may include one or more entries such as one containing user time tracking category (110) associated with the user client information (111). If the user of the machine B (117) is authorized to perform work for the client identified by the time tracking category (103) in the client list (102), the user time tracking category (110) in the user client list (105) may be the same as the time tracking category (103) and the user client information (111) may be related to, a portion of, or the same as the client information (104) according to the pre-determined access authorization scheme. The user client list (105) and the entries in the client list (102), although containing similar information, may have different formats and be configured as different data structures. For example, either of the user client list (105) or the client list (102) may be configured as one or more lists, one or more tables, one or more databases, one or more files, or any other suitable configurations and combinations thereof.

Furthermore, based on a selected event, the application B (107) may generate a time submission form (108) pre-filled with pertinent information obtained from the event manager (106) and the user client list (105). The time submission form (108) may be converted into a time tracking record (109) upon a user action. The time tracking record (109) may then be provided to the application A (118) for performing various intended management functions.

In one or more embodiments of the invention, the machine A (101) may be a server running the application A (118) such as a corporate financial application, a time entry application, an accounting application, a human resource application, and/or a client relationship management application. These applications may manage various corporate information linked to a specific client and/or to a project for a specific client. In general, one or more projects may be actively worked on for a client; each project may include multiple tasks each involving multiple events. Information associated with a client may be stored in the client list (102) where time tracking category (103) identifies the client and client information (104) including administrative information such as one or more names of the client, one or more addresses of client's offices, one or more phone numbers/email addresses/messaging system identifications of client contacts, and/or other relevant information. The client information (104) may be used in composing an event such as an appointment, a phone call, an email, a text message, etc. The time tracking category (103) may be used in categorizing the projects or tasks performed for the client into different customer jobs/service items. A project for a client may be identified by a project ID (not shown), which may be stored separately or concatenated with the time tracking category as a single value. Similarly, client information (104) may also incorporate project specific fields. The client list (102) may be maintained in one or more databases, one or more flat files, other suitable type of datastores, or any combinations thereof. New entries may be added to the client list (102) and existing entries may be modified and/or deleted.

In one or more embodiments of the invention, the machine B (117) may be a desktop PC or a notebook PC used by the user in conjunction with a mobile computing device (e.g., PDA or smart cellular phone, not shown). The event manager (106) may synchronize with the mobile computing device for importing, exporting, and/or merging the event records. For example, the event record (113) may be created on the mobile computing device and imported to the machine B (117) or vice versa.

In one or more embodiments of the invention, the machine B (117) may be a mobile computing device such as a PDA or cellular phone. The event manager (106) may be a personal productivity application for managing events such as appointments, phone calls, emails, text messages, etc. for the user of machine B (117). Portions of the events may relate to tasks performed for a client or a project of a client by the user where time spent needs to be tracked. These events may be managed by the event manager (106) in a format such as the event record (113). Examples of the event record (113) include appointment entries in a calendar, phone call entries in a call log, email entries in a email repository, message entries in a text message log, etc. where the calendar, call log, email repository, text message log, etc. are functionalities provided by the event manager (106).

In the example of an appointment event, the event client information may be the name of the client; the time stamp may include the start time, end time, and/or the duration of the appointment. In the example of a phone call event, the event client information may be the phone number; the time stamp may include the start time, end time, and/or the duration of the phone call. In the example of an email event, the event client information may be the email address; the time stamp may include the sending or receiving time for the email. In the example of text message event, the event client information may be the text message ID; the time stamp may include the sending or receiving time for the text message.

In general, the user of the machine B (117) schedules and attends appointments, initiates and answers phone calls, sends and receives emails and text messages. These events are typically involved in performing a task, or at least a portion of a task. In one or more embodiments of the invention, the event manager (106) may be a built-in function of the machine B (117) or a separate application installed by the user. The application B (107) may be a stand alone application, a plug-in module installed onto the event manager (106), or a built-in function of the machine B (117).

In one or more embodiments of the invention, the machine B (117) may be a mobile computing device with integrated communication function (e.g., PDA or smart cellular phone) where the event manager (106) creates an event record when an event occurs. For example, the event manager (106) creates an appointment entry when the user schedules an appointment using the calendar function in the native user interface (112). The time stamp of the appointment record is determined based on the appointment details. In addition, the event manager (106) generates a time stamp and creates a phone call entry in the call log, an email entry in the email repository, and a text message entry in the text message log when the phone call, email, and text message events occur.

In general, the native user interface (112) may provide generic functionalities such as select, view, edit, delete, close, etc. as well as specific functionalities for each of the calendar, call log, email repository, text message log, etc. functions. These various event records may be selected, viewed, modified, deleted, forwarded, replied, etc. using functions provided in the native user interface (112). The native user interface (112) typically projects a consistent "look and feel" across the various commands and functions.

In one or more embodiments of the invention, the application B (107) may expand the native user interface (112) with the expanded user interface (116), for example based on an application programming interface of the event manager (106). Preferably, the expanded user interface (116) assumes the consistent "look and feel" of the native user interface (112). The expanded user interface (116) may include an additional time tracking command (not shown) for engaging the application B (107) to display the time submission form (108) based on a selected event record (e.g., the event record (113)). In one or more embodiments of the invention, the time submission form (108) is filled out by the user manually. In one or more embodiments of the invention, the time submission form (108) may be prefilled with a time tracking category (e.g., the user time tracking category (110)) and an estimated billable time estimated from a time stamp (e.g., the time stamp (115)) based on a mapping function of the application B (107).

In one or more embodiments of the invention, the application B (107) includes functionality to map an event record (113), such as a calendar entry, a call log entry, an email repository entry, a text message log entry, etc. to a client or a project of a client identified by a time tracking category (e.g., the user time tracking category (110)) in the user client list (105). In other words, the application B (107) is configured to determine the client or a project of the client to which the event record may be related. In one or more embodiments of the invention, the time tracking command in the expanded user interface (116) causes the event client information (114) to be extracted from the event record (113) and provided to the application B (107) for searching an associated time tracking category in the user client list (105). If the event client information (114) can be matched to at least one of the names, addresses, phone numbers, email addresses, text message identifications, etc. of the user client information (111), then the user time tracking category (110) is determined to be the associated time tracking category for the event record (113). In addition, the time tracking command causes the time stamp (115) to be extracted and provided to the application B (107). In one or more embodiments of the invention, the event client information (114) and the time stamp (115) are provided to the application B (107) via an application programming interface (not shown) of the event manager (106).

As described above, the time tracking category associated with an event may be determined by matching an event client information to a client information in the user client list where the matched client information is used to determine the associated time tracking category. In one or more embodiments of the invention, the application B (107) includes functionality to present time tracking categories (e.g., customer jobs, service items. etc.) available for the client from the user client list (105) based on the associated time tracking category as determined above. In one or more embodiments of the invention, the available time tracking categories may be presented for user selection to categorize the time spent for the client. In one or more embodiments of the invention, the application B (107) includes functionality to automatically determine the time tracking category based on the event client information (114).

In one or more embodiments of the invention, the application B (107) includes functionality to estimate a billable time based on the time stamp information. The billable time may be estimated based on a duration recorded in the time stamp (e.g., the duration of a calendar entry or a call log entry) or set to a pre-determined value according to a pre-determined time estimation strategy such as based on the nature of the event (e.g., 10 minutes for email event, 2 minutes for text message event, etc.). In one or more embodiments of the invention, the application B (107) includes functionality to create a task note related to the event record (113). This may be accomplished by extracting keywords from a text in the event record according to a pre-determined keyword extraction strategy.

In one or more embodiments of the invention, the application B (107) includes functionality to generate and/or edit one or more time submission form (e.g., the time submission form (108)), which includes time entry information (e.g., the time tracking category categorizing the event and the estimated billable time) and optionally a task note associated with the event. A time submission form may also identify the user performing the task and corresponding billing rate information. The billing rate may be different for different types of events.

In one or more embodiments of the invention, the application B (107) is configured to improve said time tracking category/customer job/service item mapping or billable time estimation based on user input. For example, a user may identify an incorrect mapping performed by the application B (107) and replace the incorrectly identified time tracking category/customer job/service item with the correct selection. Similarly, the user may edit the task note and/or the estimated billable time to more accurately reflect the description of the task and time spent performing tasks involving the event. In response, the application B (107) may update the existing search criteria, and/or pre-determined strategies to avoid making similar errors in future time tracking category/customer job/service item mappings and improve task description and time estimation accuracies. In other words, the application B (107) may have a learning component to improve functionality of the application B (107).

Once the user is satisfied with the information (e.g., the time entry information) displayed in the time submission form (e.g., the time submission form (108)), a time tracking record (e.g., the time tracking record (109)) may be generated based on the information. In one or more embodiments of the invention, the application B (107) includes functionality to track the time spent working on tasks relating to a particular project, client, or type of event. In other words, the one or more time tracking records may be summarized and/or categorized for presenting to the user for review. In addition, one or more time tracking records may be stored, printed, displayed, and/or transmitted in any format (e.g., hypertext markup language (HTML), extensible markup language (XML), Javascript, XFORMS, microformat, etc.). The one or more time tracking records may be transmitted to the machine A (101) via the network (120).

In one or more embodiments of the invention, the application B (107) includes functionality to form the user client list (105) by retrieving at least a portion of the client list (102) from the machine A (101) according to an access authorization scheme determined during a set up phase of the application B (107). In one or more embodiments of the invention, the user client list (105) is synchronized with the client list (102) as the application A (118) may update the client list (102) from time to time. In one or more embodiments of the invention, the user client list (105) in the machine B (117) is separate from a contact list (not shown) maintained by the event manager (106). In one or more embodiments of the invention, the user client list (105) in the machine B (117) may be integrated with a contact list (not shown) maintained by the event manager (106).

In one or more embodiments of the invention, the application A (118) includes functionality to perform billing and/or payment functions based on a time tracking record received from the machine B (117). For example, the application A (118) may be configured to generate a bill for any time spent working on one or more tasks. Alternatively, the application A (118) may be configured to issue a payment (i.e., to a user) for the time spent on one or more tasks.

In one or more embodiments of the invention, the machine B (117) may be a mobile computing device (e.g., PDA or smart cellular phone, not shown) of the user or may be used by the user in conjunction with the mobile computing device of the user where the mobile computing device (or mobile device) is configured with time and location tracking functionality, such as a timer and a global positioning system (GPS). In such embodiments, application B (107) may be configured with functionality to obtain current GPS coordinates and search for a matching client address in the user client list (105) to detect a meeting event at a client location.

In one or more embodiments of the invention, the client address in the user client list (105) includes corresponding GPS coordinate information. A time submission form may then be generated and displayed based on the detected meeting event. A billable time estimate may be determined based on the elapsed time (or duration) during which the address matches the GPS coordinates. Furthermore, application B (107) may be further configured to communicate with other GPS equipped mobile devices used by other users (e.g., a co-worker) and receiving GPS coordinates of the co-worker to detect a collaboration event based on the proximity of the user and the co-worker. Alternatively, GPS coordinate of the co-worker may be reported to the machine A (101) or the exchange server (121) and sent to the mobile device of the user via the exchange server (121). In such embodiment, the client information in the client list or user client list may include mobile device identification information of an authorized collaborating co-worker. A time submission form may then be generated based on the detected collaboration event. A billable time estimate may be determined based on the elapsed time (or duration) during which the proximity is detected. The time tracking category may be associated with certain identification information of the GPS equipped mobile device used by the co-worker participating in collaborating tasks related to the corresponding client. Further, using a similar approach, the detected collaboration event may be identified as a recurring event based on the co-workers participating in collaborating tasks at a regular interval. The recurring event may then be identified to the user for populating a calendar or a default time submission form (populated based on the information from the completion of prior event) for the time and date of the recurring event.

Figure 1B:
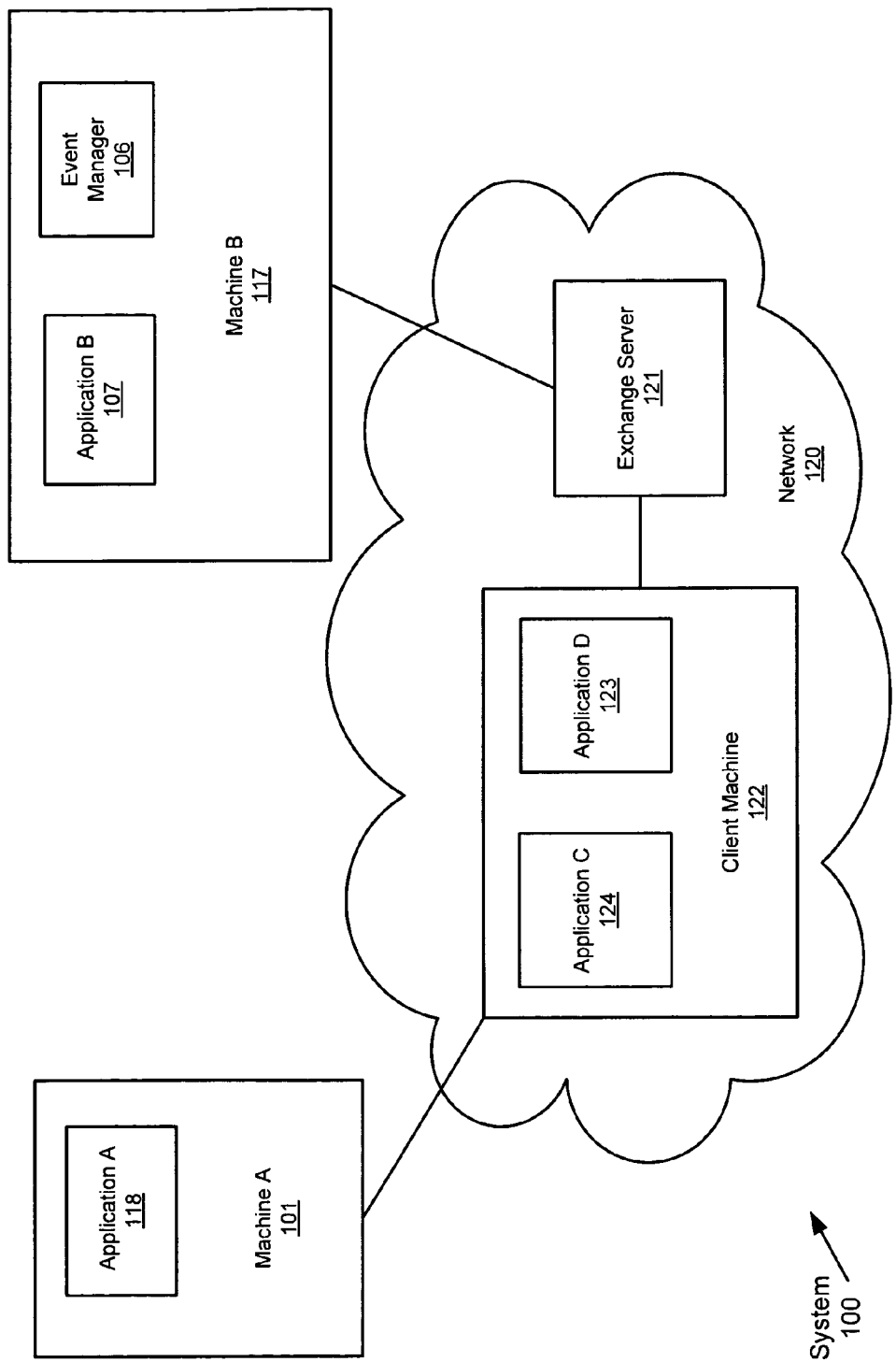

FIG. 1B shows the system (100) with more details in the network (120) in accordance with one or more embodiments of the invention. As shown in FIG. 1B, the system (100) has essentially the same components described with respect to FIG. 1A above. Certain details in the machine A (101) and the machine B (117) are omitted for clarity. In addition, the network (120) includes exchange server (121) and client machine (122) having application C (124) and application D (123).

In one or more embodiments of the invention, the machine B (117) is a mobile computing device (e.g., PDA or smart cellular phone, etc.) and the client machine is a desktop PC or a notebook PC. The application D (123) of the client machine (122) is configured with functionality to manage appointment calendar, phone log, etc. In one or more embodiments of the invention, the application D (123) is a variation (e.g., a different version) of the event manager (106) that is adapted to provide such management functions on a desktop PC or a notebook PC. In such embodiments, the user may manage the event records using the mobile computing device (i.e., machine B (117)) in the field and using the client machine (122) in the office.

In one or more embodiments of the invention, the exchange server (121) is operatively coupled to the machine B (117) and the client machine (122) via network connections of the network (120). The exchange server (121) is configured with functionality to synchronize the various event records (e.g., appointments in the calendar) managed by the event manager (106) and the application D (123). In other words, an event record created, received, modified, or deleted by the event manager (106) on the machine B (117) is synchronized with a corresponding event record managed by the application D (123) on the client machine (122) via the exchange server (121), and vice versa.

As described with respect to FIG. 1A above, time entry information (e.g., time tracking category/customer job/service item/billable time) may be added to an event record using the application B (107) to generate a time tracking record on the machine B (117). The time entry information may be added manually by the user or estimated and prefilled in the time submission form based on functionality configured in application B (107). In one or more embodiments of the invention, the time tracking record is formatted the same as the event record albeit having this additional time entry information. For example, the time entry information may be added in a generic data field of the event record such that the added time entry information is simply transmitted with time tracking record as a surrogate event record to create or modify a corresponding event record on the client machine (122) based on the synchronization functionality of the exchange server (121).

In one or more embodiments of the invention, the client machine (122) is installed with the application C (124), which is configured with the functionality to work in conjunction with the application D (123) (e.g., via an application programming interface) to extract the time entry information transmitted from the event manager (106). In one or more embodiments of the invention, the client machine (122) is operatively coupled to the machine A (101) via network connections of the network (120). The application C (124) is further configured with the functionality to work in conjunction with the application A (118) (e.g., a corporate financial application, a time entry application, an accounting application, a human resource application, and/or a client relationship management application) to perform various intended management functions using the extracted time entry information.

Although, in the example given above machine B (117) is a mobile computing device (e.g., PDA or smart cellular phone, etc.) and the client machine a desktop PC or a notebook PC, one skilled in the art with the benefit of this disclosure will appreciate that the invention may be practiced with any combination of the machine B (117) and/or the client machine (122) being a desktop PC, a notebook PC, a mobile computing device, or other suitable mobile computing devices.

Figure 2A:
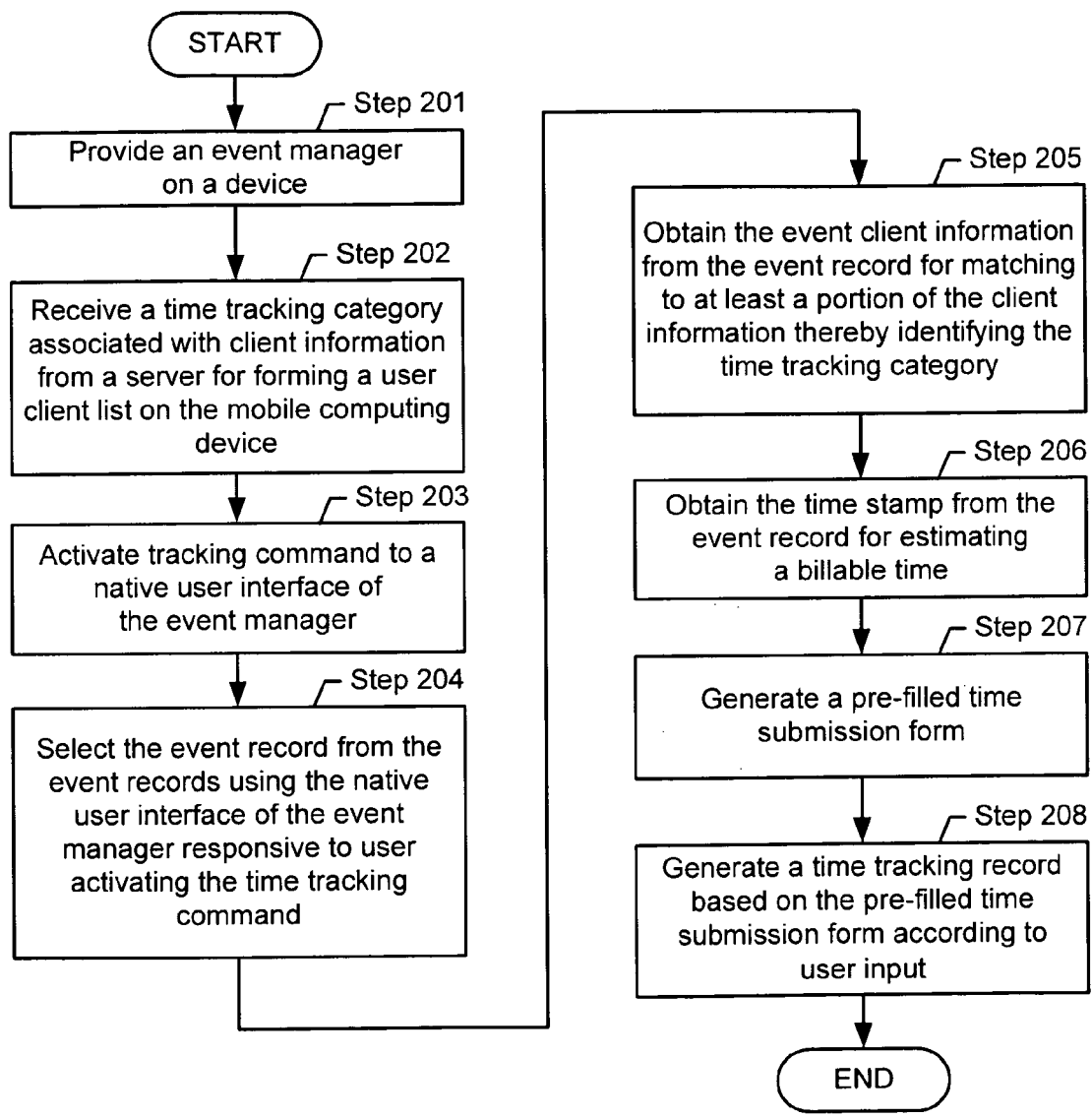
FIGS. 2A and 2B depict flowcharts of a method in accordance with one or more embodiments of the invention.

FIG. 2A shows a flowchart in accordance with one or more embodiments of the invention. The process shown in FIG. 2A may be used, for example, by the system (100) of FIG. 1A for mapping event records to tasks performed for a client or a project of a client and generating one or more time tracking record based on the selected events. Those skilled in the art, having the benefit of this detailed description, will appreciate the sequence of steps shown in FIG. 2A may differ among embodiments of the invention, and that one or more of the steps may be optional.

Initially, an event manager is provided on a device (Step 201). As described with respect to FIG. 1A above, the event manager may be user productivity software, which may be originally built-in or separately installed by a user on the device. The device may be a desktop PC, a notebook PC, a cellular phone, a PDA, or other suitable devices. The event manager may include a native user interface to allow user interaction with various personal events and associated event records such as scheduling and reviewing appointments, initiating, receiving phone calls/email/text message and reviewing the phone call log/email repository/text message log, etc. In addition, the event manager may include a contact list for managing personal contact information related to appointments, phone calls, etc.

A time tracking category and associated client information may be received from a server for forming a user client list on the device (Step 202). As discussed above, the time tracking category and client information may be retrieved from a company wide client list maintained on the server. The user client list may be retrieved based on a pre-determined access authorization scheme to include the clients for which the user of the device is authorized to perform work or task. The time tracking category typically uniquely identifies the client for various management functions performed on the server. The client information typically includes client name, address, phone numbers, email addresses, text message identification, and/or other relevant information. Such client information may be used in various events (e.g., appointment, phone call, email, message, etc.) involved in performing tasks for the client. The user client list formed on the device and the client list maintained on the server, although containing similar information may be organized in a different format and stored in different data structures. The user client list may be separate from the contact list maintained by the event manager.

A time tracking command is added to the native user interface of the event manager (Step 203). As discussed above, the native user interface may allow the user to open, edit, delete, review, or otherwise manage the event records. The time tracking command may be added to a menu of the native user interface and form an expanded user interface preferably with a consistent "look and feel" to the native user interface. More details of the expanded user interface are described in examples in FIGS. 3A-3F and 4A-4B below.

The event manager manages event records (e.g., appointment in the calendar, phone call in the call log, etc.) as events are initiated or otherwise occur. An event may be selected for reviewing using the native user interface of the event manager. The event record may be selected for converting into a time submission form responsive to user activating the time tracking command (Step 204). Examples of the time submission form are described with respect to FIGS. 3A-3F and 4A-4B below.

The event client information may be extracted from the selected event record for matching to at least a portion of event client information from the user client list thereby identifying the time tracking category (Step 205). As discussed above, the event client information may be a client name for an appointment event, a phone number for a phone call event, an email address for an email event, a text message identification for a text message event, etc. The event client information extracted from the event record may be matched to at least one of the client names, phone numbers, email addresses, text message identifications, addresses, collaborating co-worker mobile computing device identifications, etc. in the client information list. Based on a match, the associated time tracking category may then be determined to identify the client for which the event is related to in performing a task. The customer job/service items available for the associated time tracking category may be presented to the user for determination or be automatically determined based on event client information.

Similarly, the time stamp information may be extracted from the selected event record for estimating a billable time relating to the identified client (Step 206). Accordingly, the time submission form may be pre-filled with the time tracking category and the estimated billable time (Step 207). As discussed above, the pre-filled time submission form may be presented to the user for review, edit, and/or approve. A time tracking record may then be generated based on the pre-filled time submission form according to user input (i.e., approval) (Step 208).

Those skilled in the art, having the benefit of this detailed description, will appreciate that the process shown in FIG. 2A may be repeated for any number of events involved in one or more tasks. Further, by identifying time submission forms associated with a time tracking category, it is possible to track the time spent on events involved in all tasks for the client.

Figure 2B:
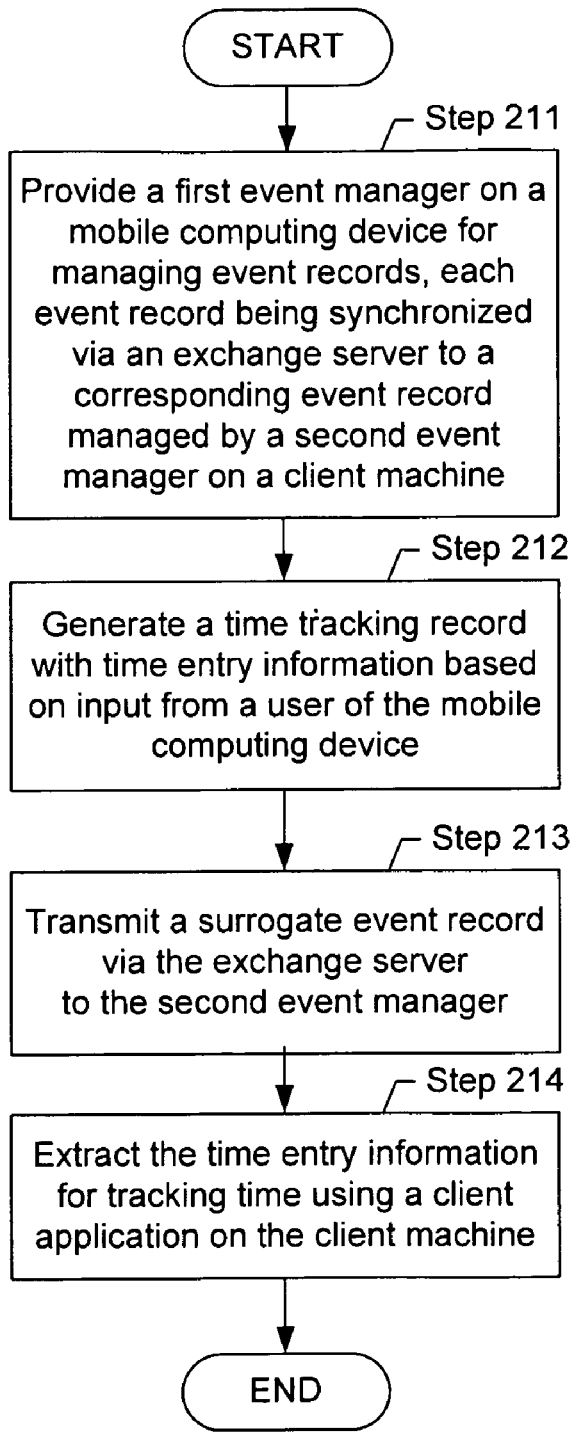

FIG. 2B shows a flowchart in accordance with one or more embodiments of the invention. The process shown in FIG. 2B may be used, for example, by the system (100) of FIG. 1B for transmitting time entry information among the various machines. In one or more embodiments of the invention, the time entry information is embedded in a time tracking record, which is treated as a surrogate event record managed by a first event manager. The surrogate event record is then synchronized to a corresponding event record managed by a second event manager, which works in conjunction with a client application to extract the time entry information from the surrogate event record for various management function performed on a client machine. Those skilled in the art, having the benefit of this detailed description, will appreciate the sequence of steps shown in FIG. 2B may differ among embodiments of the invention, and that one or more of the steps may be optional.

Initially in Step (211), a first event manager is provided on a mobile computing device. The mobile computing device may be configured with the functionality for personal activities such as to schedule and review calendar appointments, initiate and receive phone call/email/text message, etc. The first event manager on the mobile computing device and the second event manager on the client machine may be personal productivity software for managing event records such as appointment event records, phone call event records, email event records, text message event records, etc. The first event manager may be synchronized via an exchange server to the second event manager such that creation, receiving, deletion, or modification of event records managed by either the first or the second event managers are transmitted to each other by the exchange server.

In Step (212), a time tracking record is generated that includes time entry information based on input from a user of the mobile computing device (e.g., manually determined information by the user or automatically determined information reviewed and accepted by the user). In one or more embodiments of the invention, the time tracking record is generated in the same format as an event record (e.g., a appointment event record) such that it can be added to the plurality of event records as a surrogate event record.

In Step (213), the surrogate event record is transmitted via the exchange server to the second event manager along with other regular event records created by the first event manager corresponding to real personal events. In one or more embodiments of the invention, the second event manager is operatively coupled to a client application on the client machine that works in conjunction with each other to extract the time entry information from the surrogate event record for tracking time (Step 214). In one or more embodiments of the invention, the client machine is further operatively coupled to a server. In such embodiments, the client application is further configured with the functionality to work in conjunction with a server application, which may be a corporate financial application, a time entry application, an accounting application, a human resource application, or a client relationship management application) to perform various intended management functions using the extracted time entry information.

Although the example given above describes a method using a mobile computing device for generating the time tracking record in the same format as an appointment event record, those skilled in the art, having the benefit of this detailed description, will appreciate that other devices such as a desktop PC, notebook PC, or other suitable devices may be used and that the time tracking record may be generated in the same format as other types of event record without deviating from the invention.

FIGS. 3A-3F and 4A-4B depict screen shots of examples in accordance with one or more embodiments of the invention. These screen shots may be generated by the system (100) as described with respect to FIG. 1A above. The screen shots depicted in FIG. 3A-3F may be from a mobile computing device such as a PDA or cellular phone. The screen shots depicted in FIG. 4A-4B may be from a client machine such as a desktop PC or a notebook PC.

Figure 3A:
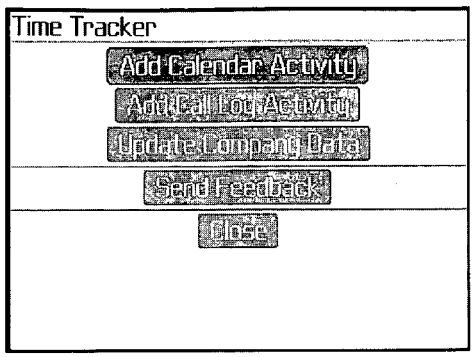
FIGS. 3A-3F and 4A-4B depict screen shots of examples in accordance with one or more embodiments of the invention.

Specifically, the example in FIG. 3A depicts an exemplary command menu (depicted as "Time Tracker"). As an example, the highlighted (i.e., selected) "Add Calendar Activity" command may be used to open a time submission form for manually filling out a appointment related time tracking record. As another example, the "Update Company Data" command may be used to update (or synchronize) the user client list on the various devices.

Figure 3B:
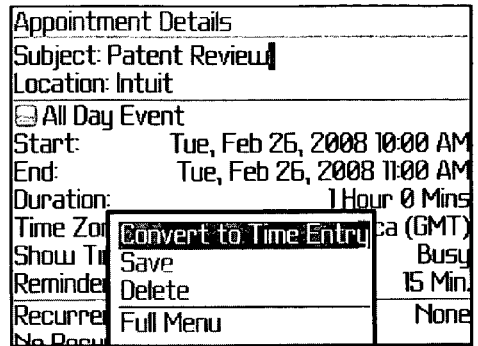

FIG. 3B depicts a screen shot (300) of an exemplary appointment event record displayed using the native user interface of the event manager. A pop-up command window (301) of the native user interface is also shown in FIG. 3B. A time tracking command (depicted as "Convert to Time Entry") is shown as inserted in the pop-up window (301) as part of the expanded user interface without deviating from the "look and feel" of the native user interface. One skilled in the art will appreciate that other formats of command window (e.g., pull down menu) may also be used. The time tracking command will then be inserted in this other format to maintain the consistent "look and feel" of the user interfaces.

Figure 3C:
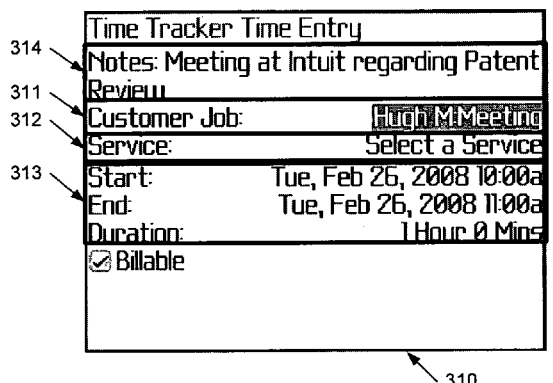

FIG. 3C depicts a screen shot (310) of an exemplary time submission form, which may be displayed as a result of user activating the "Convert to Time Entry" command in the pop-up menu (301) of FIG. 3B. As shown in FIG. 3C, the "Start", "End", and "Duration" fields (313) in the screen shot (310) are pre-filled based on the corresponding time stamp information depicted in screen shot (300) of the exemplary appointment event record. In addition, the event client information "Intuit" is extracted from the exemplary appointment event record depicted in screen shot (300) to determine the time tracking category (not shown). Accordingly, available customer job/service items may be determined based on the time tracking category from the user client list. As shown in FIG. 3C, the "Customer Job" field (311) is filled in as "Hugh M: Meeting" based on manual selection by the user or automatic determination. In one or more embodiments of the invention, the user selection may be based on a pop-up menu (not shown) listing all customer job selections available with respect to the time tracking category. In one or more embodiments of the invention, the automatic determination may be based on a keyword matching algorithm detecting an occurrence of "Hugh M: Meeting" in a note field (not shown) of the exemplary appointment event record depicted in screen shot (300). Further as shown in FIG. 3C, the service field (312) showing "Select a Service" prompting user action to display a pop-up menu (not shown) for selecting service items available with respect to the time tracking category. Furthermore, the "Notes" field (314) in the screen shot (310) of the exemplary time submission form is pre-filled with pre-determined text "Meeting at XXX regarding YYY" where XXX and YYY are substituted with the location information "Intuit" and subject information "Patent Review" extracted from the exemplary appointment event record depicted in screen shot (300).

Figure 3D:
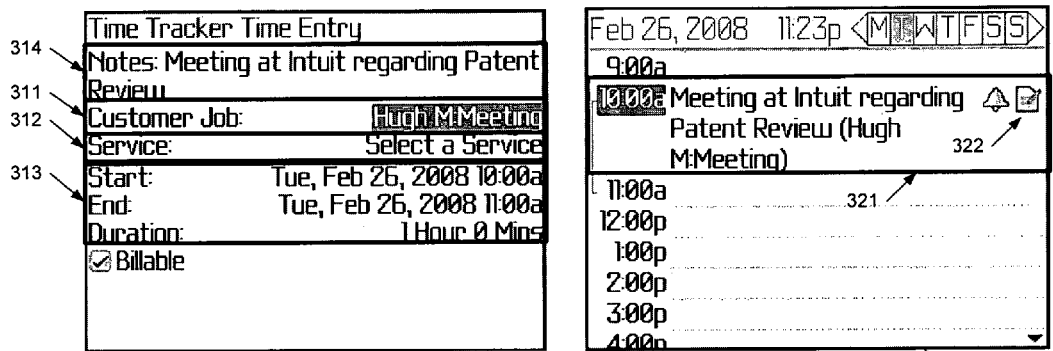

The time submission form, as depicted by the screen shot (310), may be accepted by the user after review and saved as a time tracking record. In one or more embodiments of the invention, the time tracking record is saved in the same format as the exemplary appointment event record depicted in screen shot (300), albeit having this additional time entry information. For example, the time entry information may be added in a generic data field of the exemplary appointment event record. FIG. 3D depicts an exemplary calendar (320) displayed using the native user interface of the event manager showing a time entry (321) representing the time tracking record converted from the exemplary appointment event record depicted in screen shot (300). As shown in FIG. 3D, the time entry (321) is indicated by a time entry icon (322) to differentiate from a regular appointment event record.

Figure 3E:
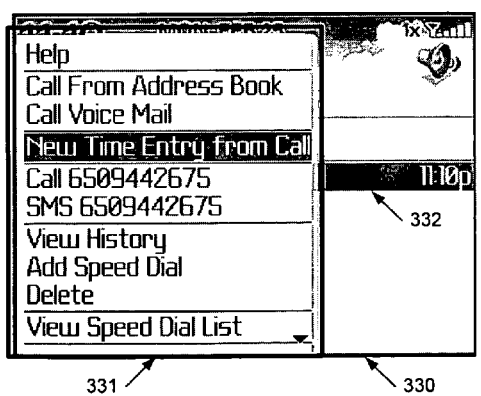

FIG. 3E depicts a display of a phone call log (330). As shown in FIG. 3E, the phone call log (330) includes a call entry (332). A pop-up command window (331) is also shown in FIG. 3E. A time tracking command (depicted as "New Time Entry from Call") is shown as inserted in the pop-up window (331) as part of the expanded user interface without deviating from the "look and feel" of the native user interface.

Figure 3F:
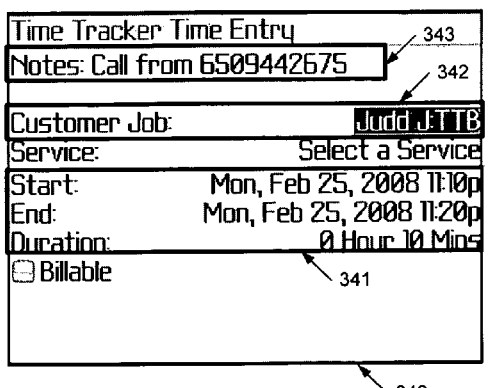

FIG. 3F depicts a screen shot (340) of an exemplary time submission form, which may be displayed as a result of user activating the "New Time Entry from Call" command in the pop-up menu (331) of FIG. 3E. As shown in FIG. 3F, the "Notes" field (343) in the screen shot (340) of the exemplary time submission form is pre-filled with pre-determined text "Call from XXX" where XXX is substituted with phone number "6509442675" extracted from the call entry (332). In addition, the "Start", "End", and "Duration" fields (341) in the screen shot (340) of the exemplary time submission form are pre-filled based on the corresponding time stamp information in the call entry (332). In addition, the phone number "6509442675" is extracted from the exemplary appointment event record depicted in screen shot (300) to determine the time tracking category (not shown). Accordingly, available customer job/service items may be determined based on the time tracking category from the user client list. As shown in FIG. 3F, the "Customer Job" field (342) is filled in as "Judd J:TTB" based on manual selection by the user or automatic determination. In one or more embodiments of the invention, the user selection may be based on a pop-up menu (not shown) listing all customer job selections available with respect to the time tracking category. In one or more embodiments of the invention, the automatic determination may be based on matching the phone number "6509442675" to "Judd J:TTB" in the user client list.

Figure 4A:
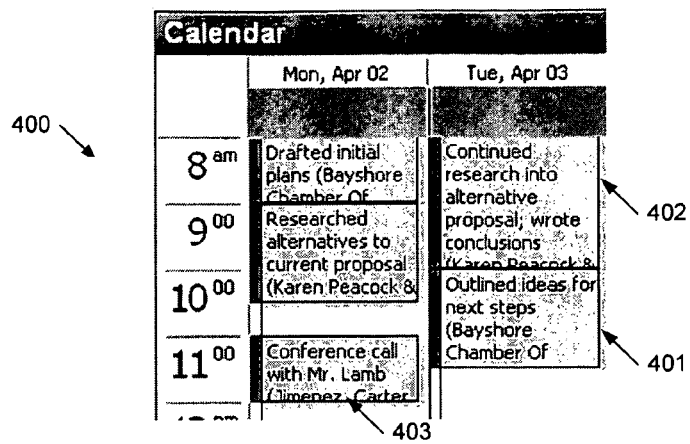

FIG. 4A depicts an exemplary calendar (400) displayed using the second event manager showing surrogate event records (401), (402), and (403), which are transmitted, for example, via an exchange server.

Figure 4B:
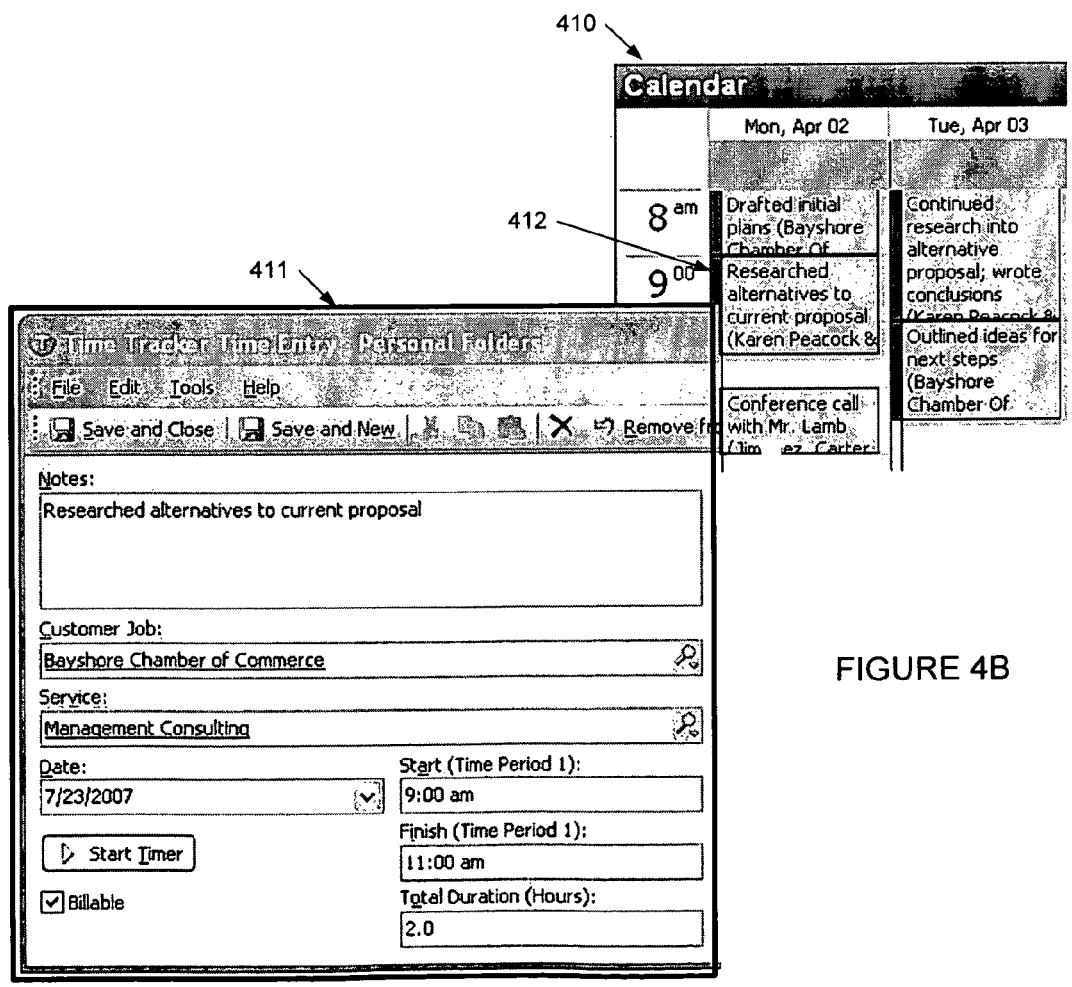

FIG. 4B depicts the exemplary calendar (410) displayed using the second event manager with a pop-up window (411) showing details of time entry information of a surrogate event record (412). The time entry information includes customer job "Bayshore Chamber of Commerce", Service "Management Consulting", Date "Jul. 23, 2007", Start "9:00 am", Finish "11:00 am", Total Duration "2.0 Hours", and Billable with a check mark. The time entry information may be extracted for performing various management functions.

Figure 5:
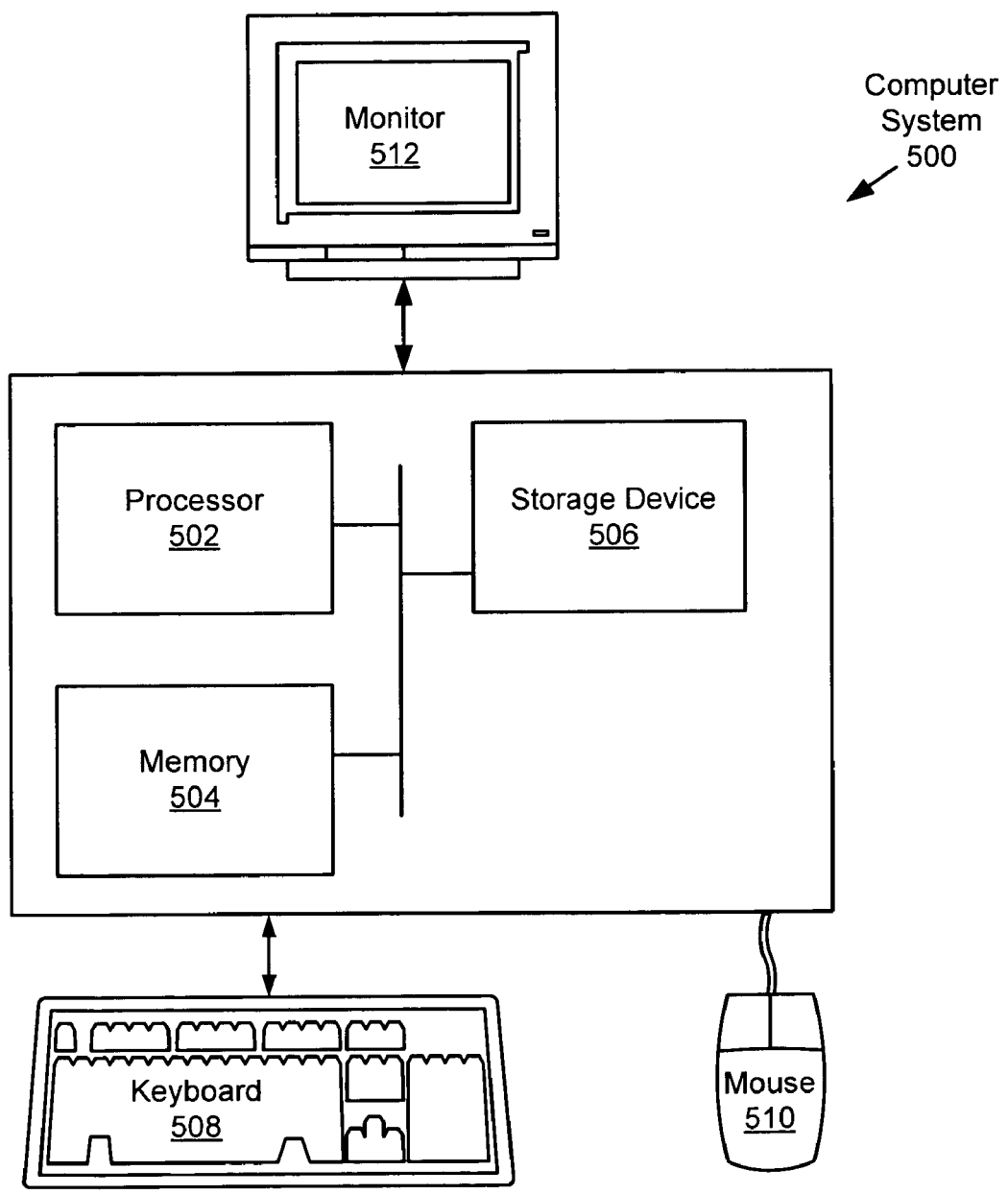
FIG. 5 depicts a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., report generator, event manager, user application, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for tracking time using a mobile computing device of a user and a mobile computing device of a co-worker of the user, comprising:
   providing a first event manager on the mobile computing device of the user for managing a plurality of event records corresponding to a plurality of events, wherein each event record of the plurality of event records is synchronized via an exchange server to a corresponding event record managed by a second event manager on a client machine;
   receiving, by the mobile computing device of the user, a plurality of coordinates created by a global positioning system (GPS) of the mobile computing device of the co-worker and mobile device identification of the mobile computing device of the co-worker;
   determining, based on the plurality of coordinates and a GPS of the mobile computing device of the user, a proximity of the co-worker and the user;
   generating, by the mobile computing device of the user and in response to the proximity being within a pre-determined range, a time stamp based on a duration of the proximity;
   identifying, by the mobile computing device of the user, a client comprising client information including the mobile device identification of the mobile computing device of the co-worker;
   generating a time tracking record comprising the time stamp and a time tracking category of the identified client, wherein the time tracking record corresponds to a meeting between the co-worker and the user regarding the time tracking category of the identified client, wherein the time tracking record is added to the plurality of event records as a surrogate event record;
   transmitting the surrogate event record via the exchange server to the second event manager, wherein the second event manager is operatively coupled to a client application on the client machine; and
   extracting the time stamp from the surrogate event record using the client application for tracking time.

2. The method of claim 1, wherein the time entry information is added to the event record manually by the user of the mobile computing device.

3. The method of claim 1,
   wherein the mobile computing device of the user, the exchange server, and the client machine are operatively coupled via a network,
   wherein at least one selected from a group consisting of the first event manager and the second event manager is a personal productivity software,
   wherein the event record comprises at least one selected from a group consisting of a calendar entry, a phone call log entry, an email repository entry, and a text message log entry, and
   wherein the time entry record further comprises a billable time calculated based on the time stamp and assigned to the time tracking category.

4. The method of claim 1,
   wherein the client application works in conjunction with a server application on a server operatively coupled to the client machine, and
   wherein the server application comprises at least one selected from a group consisting of a corporate financial application, a time entry application, an accounting application, a human resource application, and a client relationship management application.

5. A method for tracking time using a mobile computing device of a user and a mobile device of a co-worker of the user, comprising:
- receiving, by the mobile computing device of the user, a plurality of coordinates created by a global positioning system (GPS) of the mobile computing device of the co-worker and mobile device identification of the mobile computing device of the co-worker;
- determining, based on the plurality of coordinates and a GPS of the mobile computing device of the user, a proximity of the co-worker and the user;
- generating, by the mobile computing device of the user and in response to the proximity being within a pre-determined range, a time stamp based on a duration of the proximity;
- identifying, by the mobile computing device of the user, a client comprising client information including the mobile device identification of the mobile computing device of the co-worker;
- generating a time tracking record comprising the time stamp and a time tracking category of the identified client, wherein the time tracking record corresponds to a meeting between the co-worker and the user regarding the time tracking category of the identified client; and
- generating a billable time estimate for the time tracking category based on the time stamp and user review.

6. The method of claim 5, wherein the time entry information is added to the event record manually by the user of the second machine.

7. A non-transitory computer readable medium storing instructions for tracking time using a mobile computing device, the instructions comprising functionality for:
- receiving a plurality of coordinates created by a global positioning system (GPS) of the mobile computing device of the co-worker and mobile device identification of the mobile computing device of the co-worker;
- determining, based on the plurality of coordinates and a GPS of the mobile computing device of the user, a proximity of the co-worker and the user;
- generating, using the mobile computing device of the user and in response to the proximity being within a pre-determined range, a time stamp based on a duration of the proximity;
- identifying a client comprising client information including the mobile device identification of the mobile computing device of the co-worker;
- generating a time tracking record comprising the time stamp and a time tracking category of the identified client, wherein the time tracking record corresponds to a meeting between the co-worker and the user regarding the time tracking category of the identified client; and
- generating a billable time estimate for the time tracking category based on the time stamp and user review.

8. A system for tracking time comprising:
- a mobile computing device of a user having a first event manager for managing a plurality of event records corresponding to a plurality of events;
- a mobile computing device of a co-worker of the user having a global positioning system (GPS) configured to generate a plurality of coordinates;
- a client machine having a second event manager and a client application operatively coupled to each other;
- an exchange server operatively coupled to the mobile computing device and the client machine, wherein each event record of the plurality of event records is synchronized via the exchange server to a corresponding event record managed by the second event manager on the client machine; and
- wherein the mobile computing device of the user further comprises memory comprising instructions executed by a processor to:
  - receive the plurality of coordinates and mobile device identification of the mobile computing device of the co-worker;
  - determine, based on the plurality of coordinates and a GPS of the mobile computing device of the user, a proximity of the co-worker and the user;
  - generate, in response to the proximity being within a pre-determined range, a time stamp based on a duration of the proximity;
  - identify a client comprising client information including the mobile device identification of the mobile computing device of the co-worker;
  - generate a time tracking record comprising the time stamp and a time tracking category of the identified client, wherein the time tracking record corresponds to a meeting between the co-worker and the user regarding the time tracking category of the identified client, wherein the time tracking record is added to the plurality of event records as a surrogate event record;
  - transmit the surrogate event record via the exchange server to the second event manager; and
  - extract the time stamp from the surrogate event record using the client application for tracking time.

9. The system of claim 8, wherein the time entry information is added to the event record manually by the user of the mobile computing device.

10. The system of claim 8,
- wherein the mobile computing device of the user, the exchange server, and the client machine are operatively coupled via a network,
- wherein at least one selected from a group consisting of the first event manager and the second event manager is a personal productivity software,
- wherein the event record comprises at least one selected from a group consisting of a calendar entry, a phone call log entry, an email repository entry, and a text message log entry, and
- wherein the time entry record further comprises a billable time calculated based on the time stamp and assigned to the time tracking category.

11. The system of claim 8, further comprising:
- a server operatively coupled to the client machine,
- wherein the client application works in conjunction with a server application on the server, the server application comprising at least one selected from a group consisting of a corporate financial application, a time entry application, an accounting application, a human resource application, and a client relationship management application.

12. A mobile computing device of a user for tracking time, comprising:
- a global position system (GPS) configured to determine a first plurality of GPS coordinates of the mobile computing device of the user;
- a processor coupled to the GPS; and
- memory comprising instructions executed by the processor to:
  - receive a second plurality of coordinates created by a GPS of a mobile computing device of a co-worker and mobile device identification of the mobile computing device of the co-worker;

determine, based on the first plurality of coordinates and the second plurality of coordinates, a proximity of the co-worker and the user;

generate, in response to the proximity being with a predetermined range, a time stamp based on a duration of the proximity;

identify a client comprising client information including the mobile device identification of the mobile computing device of the co-worker;

generate a time tracking record comprising the time stamp and a time tracking category of the identified client, wherein the time tracking record corresponds to a meeting between the co-worker and the user regarding the time tracking category of the identified client; and generate a billable time estimate for the time tracking category based on the time stamp and user review.

13. The mobile computing device of claim 12, wherein the time entry information is added to the event record manually by the user of the first machine.

* * * * *